US007852872B2

(12) United States Patent
Fischer (10) Patent No.: US 7,852,872 B2
(45) Date of Patent: Dec. 14, 2010

(54) SYSTEM AND METHOD FOR MESSAGE QUEUE MANAGEMENT IN A POWER-SAVE NETWORK

(75) Inventor: Matthew J. Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 29 days.

(21) Appl. No.: 12/464,205

(22) Filed: May 12, 2009

(65) Prior Publication Data

US 2009/0219847 A1 Sep. 3, 2009

Related U.S. Application Data

(63) Continuation of application No. 10/770,160, filed on Feb. 2, 2004, now Pat. No. 7,532,639.

(60) Provisional application No. 60/501,781, filed on Sep. 10, 2003, now abandoned.

(51) Int. Cl.
*H04L 12/413* (2006.01)

(52) U.S. Cl. ..................................... 370/445

(58) Field of Classification Search ................ 370/445, 370/444, 447, 448, 450, 454, 455, 456, 458, 370/459, 561, 462
See application file for complete search history.

(56) References Cited

U.S. PATENT DOCUMENTS

| 4,506,360 | A | | 3/1985 | Kryskow et al. |
| 5,613,067 | A | * | 3/1997 | Brady et al. ................ 709/225 |
| 5,644,576 | A | | 7/1997 | Bauchot et al. |
| 5,657,317 | A | | 8/1997 | Mahany et al. |
| 5,917,822 | A | * | 6/1999 | Lyles et al. ............. 370/395.4 |
| 6,192,053 | B1 | * | 2/2001 | Angelico et al. ........... 370/448 |
| 6,834,045 | B1 | | 12/2004 | Lappetelainen et al. |
| 6,879,579 | B1 | | 4/2005 | Myles et al. |
| 6,996,074 | B2 | | 2/2006 | Garcia-Luna-Aceves et al. |
| 7,095,754 | B2 | * | 8/2006 | Benveniste ................ 370/465 |
| 7,280,555 | B2 | | 10/2007 | Stanforth et al. |

OTHER PUBLICATIONS

EP 04017688 European Search Report.
Draft Supplement to Standard for Telecommunication and Information Exchange Between System, LAN-MAN Specific Requirements. Part 11 Wireless Medium Access Control (MAC) and Physical Layer (PHY) Specifications Online May 1, 2002 Retrieved from the Internet on Oct. 7, 2004: URL:http//cygnus.et.put.poznan.pl/{rkotrys/802_11/802.11e-D3_draft.pdf>.

(Continued)

*Primary Examiner*—Brenda Pham
(74) *Attorney, Agent, or Firm*—McAndrews, Held & Malloy, Ltd.

(57) ABSTRACT

A method and apparatus for communicating information between networked devices. Various aspects of the present invention may comprise, for example, a first networked device communicating information over a wireless communication network to a second networked device having power-save mode capability. The first networked device receives an incoming message from the second networked device. A first outgoing message is transmitted to the second networked device prior to transmitting a previously queued outgoing message. A second outgoing message is transmitted to the second networked device prior to the previously queued outgoing message being transmitted. Information may be communicated to the second networked device in a particular manner that depends on whether the second networked device has power-save capability. Communication medium access may be performed in a particular manner, depending on whether the second networked device has power-save capability.

46 Claims, 4 Drawing Sheets

OTHER PUBLICATIONS

IEEE 802.11-02 604R1 Normative Txte for TGe Consensus Proposal, Online Sep. 12, 2002, Retrieved from the internet on Oct. 7, 2004: URL: http://grouper.ieee.org/groups/802/11/Documents/D2T601-650.html>.

Woesner H et al: "Power-Saving Mechanisms in Emerging Standards for Wireless LANs: The MAC Level Perspective" IEEE Personal Communications, IEEE Communications Society, US vol. 5, No. 3, Jun. 1, 1998, pp. 40-48.

* cited by examiner

SYSTEM AND METHOD FOR MESSAGE QUEUE MANAGEMENT IN A POWER-SAVE NETWORK

CROSS-REFERENCE TO RELATED APPLICATIONS/INCORPORATION BY REFERENCE

This patent application is a CONTINUATION of U.S. patent application Ser. No. 10/770,160, filed Feb. 2, 2004, which claims the benefit of U.S. Provisional Application No. 60/501,781 (now abandoned), filed Sep. 10, 2003. The above-identified applications are hereby incorporated herein by reference in their entirety. This patent application is related to U.S. patent application Ser. No. 10/770,171, filed Feb. 2, 2004, titled "SYSTEM AND METHOD FOR MEDIUM ACCESS CONTROL IN A POWER-SAVE NETWORK."

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

FIELD OF THE INVENTION

The present invention relates generally to message queue management. More specifically, the present invention relates to method and apparatus for managing and utilizing a message queue in a power-save network.

BACKGROUND OF THE INVENTION

Modern communication networks include a vast array of device types. Such device types may include, for example, wired and wireless devices, and stationary and portable devices. Some networked devices may have relatively limitless electrical power supplies, for example, those drawing electrical power from wall outlets. Conversely, some networked devices may have limited power supplies, for example, those operating on internal batteries.

Networked devices operating with limited power supplies may adopt operating characteristics that are conducive to conserving their limited supplies of power. For example, some devices may have an operating mode, sometimes called a "sleep mode" or "power-save mode," where the device shuts down or slows down many of its internal functions to conserve energy. Such functions may include, for example, network communication functionality. Such devices may, for example, periodically or on-command exit the power-save mode and re-establish communications with other networked devices.

For example, a remote network device in power-save mode may exit the power-save mode and establish communications with a communication network access point. Once such communications are established, the exemplary remote network device and network access point may exchange information. For example, the remote device may transmit information to the access point that is destined for another networked device, and the access point may transmit information to the remote device that the access point had buffered for the remote device while the remote device was in power-save mode and unable to communicate with the access point.

The process of communicating information between the exemplary remote device and network access point, and between devices in general, consumes energy. The process of merely monitoring the network while waiting for the arrival of a packet also consumes energy. Communication networks are generally governed by various communication procedures and protocols that control various communication functions. Such functions may include, for example, access to the communication medium and message queuing. Such medium access protocols, message queuing procedures, and other rules or procedures governing information transfer typically include aspects that are inefficient with regard to, for example, energy consumption, information transfer speed, and bandwidth utilization.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a method and apparatus for communicating information between networked devices in a communication network. Various aspects of the present invention may comprise, for example, a first networked device communicating information over a wireless communication network to a second networked device having power-save capability. The first and second networked devices may each include, for example, respective communication modules.

Various aspects of the present invention may comprise the first networked device receiving an incoming message from the second networked device. The incoming message may, for example, indicate that the second networked device is not presently operating in a power-save mode and/or is ready to receive information. The incoming message may, for example, be a control message. The incoming message may, for example, be a data message comprising an indication that the second networked device has no more information to transmit to the first networked device.

Various aspects of the present invention may comprise transmitting a first outgoing message to the second networked device prior to transmitting a previously queued outgoing message. The first outgoing message may be, for example, a data message or a control message. Various aspects may comprise waiting for a second incoming message after transmitting the first outgoing message. A second outgoing message may be transmitted to the second networked device prior to transmitting the previously queued outgoing message.

Various aspects of the present invention may comprise determining whether the second networked device has power-save capability. Such determination may, for example, comprise analyzing information in a database to determine if the second networked device has power-save capability. Information may be communicated to the second networked device in a first manner if the second networked device has power-save capability and in a second manner if the second networked device does not have power-save capability.

Various aspects of the present invention may comprise accessing the network communication medium in a particular manner, depending on whether the second networked device has power-save capability. Such medium access may, for example, comprise taking control over the communication medium without contending with other networked devices for access to the communication medium. Access to the communication medium may be limited to, for example, a maximum time limit for a particular message exchange sequence.

These and other advantages, aspects and novel features of the present invention, as well as details of illustrative aspects thereof, will be more fully understood from the following description and drawings.

DETAILED DESCRIPTION OF THE INVENTION

Figure 1:
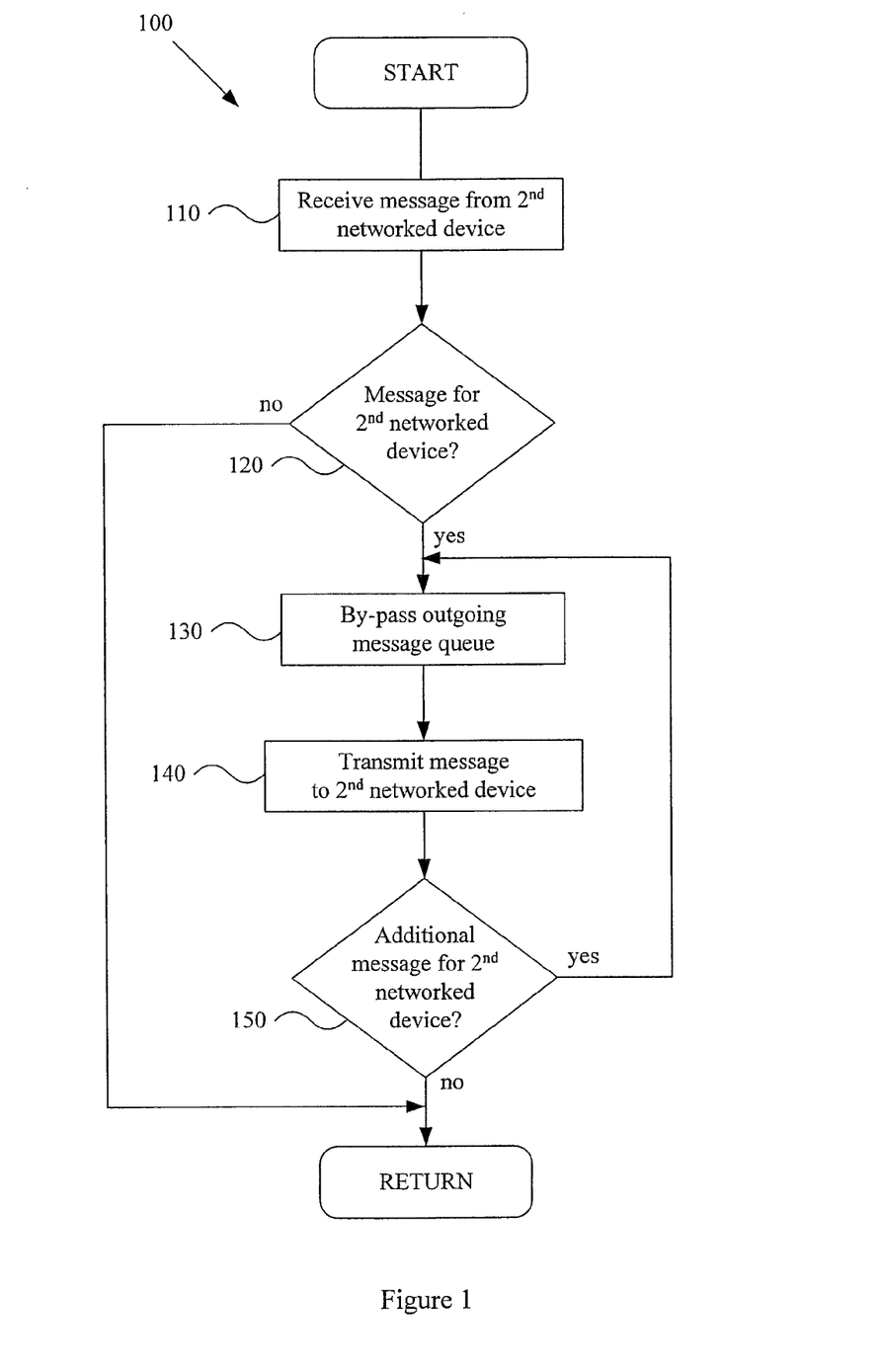
FIG. 1 shows a flow diagram of a method for communicating information from a first networked device having an outgoing message queue to a second networked device in accordance with various aspects of the present invention.

FIG. 1 shows a flow diagram of a method 100 for communicating information from a first networked device having an outgoing message queue to a second networked device in accordance with various aspects of the present invention. The method 100 may, for example, be implemented in a first networked device in a communication network. Such a communication network may, for example, be a wireless communication network. The first networked device may have a queue for outgoing messages that are to be transmitted over the communication network.

The method 100 includes, at step 110, receiving an incoming message from a second networked device. The second networked device may, for example, be a device having power-save capability that is communicatively coupled to the first networked device over the communication network. The incoming message may, for example, indicate that the second networked device is ready to receive information from the first networked device. If the second networked device is capable of power-save operation (e.g., capable of entering and exiting an operating mode in which the device consumes a relatively low amount of energy), the incoming message may, for example, indicate that the second networked device is not currently in a sleeping state of a power-save mode. Note that various aspects of the present invention should not be limited to methods and apparatus associated with power-save devices.

The incoming message may assume a variety of forms, including, but not limited to, a data message and a control message. The incoming message may, for example, be a data message including an indication that the second networked device has no data, or no more data, to send to the first networked device. Accordingly, the scope of various aspects of the present invention should not be limited to the form of the incoming message.

The method 100, at step 120, includes determining if the first networked device has a message for delivery to the second networked device. The first networked device may, for example, include a message buffer in which the first networked device stores outgoing messages destined for other networked devices. For example, in a communication network having networked devices capable of power-save operation, the first networked device may buffer outgoing messages that are addressed to the second networked device. The first networked device may buffer such messages, for example, until the first networked device receives an indication that the second networked device, while operating in power-save mode, is not currently in a sleeping state.

If step 120 determines that the first networked device does not have an outgoing message to send to the second networked device, the method 100 flow may end, at which time the operation of the first networked device may, for example, return to the mode of operation at which the first networked device was operating when the incoming message arrived. Conversely, if step 120 determines that the first networked device has an outgoing message to send to the second networked device, the method 100 flow may continue to step 130.

The method 100, at step 130, includes bypassing the outgoing message queue to transmit, at step 140, the outgoing message to the second networked device. For example, when the first networked device received the incoming message, the first networked device may have had one or more outgoing messages in an outgoing message queue waiting for transmission. Rather than placing the buffered outgoing message destined for the second networked device in the non-buffered outgoing message queue to wait in line behind the messages already queued in the outgoing message queue, step 130 includes by-passing one or more messages in the non-buffered outgoing message queue. Thus, step 130 provides for the outgoing message destined for the second networked device to be delivered to the second networked device in a timely manner.

An exemplary advantage provided by step 130 is that in a power-save scenario where the second networked device has emerged from a power-save mode to communicate with the first networked device, the second networked device may complete its communications with the first networked device and return to the sleeping state of the power-save mode in a time-efficient manner, thereby reducing unnecessary energy consumption by the second networked device.

The outgoing message transmitted to the second networked device may take various forms. For example, in a scenario where the first networked device is able to retrieve a buffered message destined for the second networked device quickly enough to meet communication system timing constraints, the outgoing message may include the buffered message. In an alternative example, the first networked device may not be able to retrieve a buffered message destined for the second networked device quickly enough to meet communication system timing constraints. In such a scenario, the first networked device may communicate a message (e.g., a null data message) to the second networked device. Such a message may, for example, provide for maintaining control over the communication medium and may also serve as an indication to the second networked device that a message or stream of message is forthcoming from the first networked device.

Note that the scope of various aspects of the present invention should not be limited to a particular form of outgoing message.

After transmitting a first outgoing message to the second networked device at step 140, the method 100, at step 150, determines if the first networked device has an additional message buffered that is destined for the second networked device. If step 150 determines that the first networked device has no more messages for the second networked device, the method 100 flow may end, at which time the operation of the first networked device may, for example, return to the operational state in which the first networked device was operating when the incoming message arrived.

Conversely, if step 150 determines that the first networked device has an additional outgoing message to send to the second networked device, the method 100 flow may loop back to step 130. Having looped back to step 130, the method 100 flow may repeat steps 130, 140 and 150 until the first networked device has no more outgoing messages buffered for the second networked device.

Figure 2:
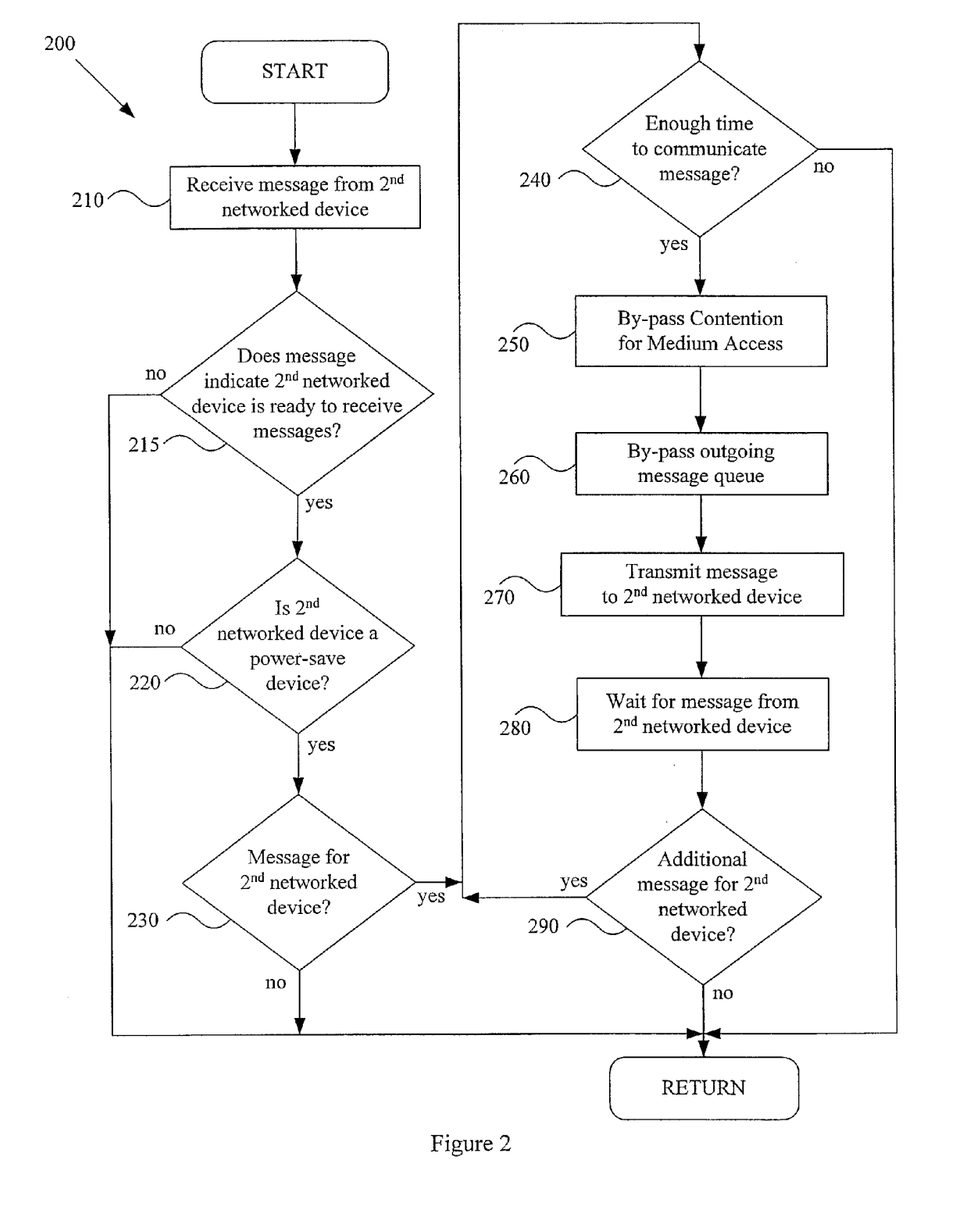
FIG. 2 shows a flow diagram of a method for communicating information from a first networked device having an outgoing message queue to a second networked device having power-save capability in accordance with various aspects of the present invention.

The method 100 illustrated in FIG. 1 shows various aspects of a method for communicating information from a first networked device to a second networked device. Refer now to FIG. 2 for an exemplary illustration of additional aspects of the present invention.

FIG. 2 shows a flow diagram of a method 200 for communicating information from a first networked device having an outgoing message queue to a second networked device having power-save capability in accordance with various aspects of the present invention. The method 200 may, for example, be implemented in a first networked device in a communication network. Such a communication network may, for example, be a wireless communication network. The first networked device may have a queue for outgoing messages that are waiting to be transmitted over the communication network.

The method 200 includes, at step 210, receiving an incoming message from a second networked device. The second networked device may, for example, be a device having power-save capability that is communicatively coupled to the first networked device over the communication network. In an exemplary scenario, the second networked device may have awakened from a sleeping state of a power-save mode, acquired access to the communication medium using a contention-based medium access protocol (e.g., CSMA/CA), and sent the incoming message to the second networked device. In an exemplary scenario, the first networked device may be an access point in a wireless communication network.

The incoming message may, for example, indicate that the second networked device is ready to receive information from the first networked device, such as is shown in step 215. If the second networked device is capable of power-save operation (e.g., capable of entering and exiting an operating state in which the device consumes a relatively low amount of energy), the incoming message may, for example, indicate that the second networked device is not currently operating in a non-communicative state of the power-save mode. Note that various aspects of the present invention should not be limited to methods and apparatus associated with power-save devices.

The incoming message may assume a variety of forms, including, but not limited to, a data message and a control message. The incoming message may, for example, be a data message including an indication that the second networked device has no data, or no more data, to send to the first networked device. Accordingly, the scope of various aspects of the present invention should not be limited to the form of the incoming message.

The method 200, at step 220, may include determining if the second networked device is operating in a power-save mode and/or whether the second networked device is currently operating in a sleep state of a power-save mode. The second networked device may, for example, be capable of operating in a "normal mode" and a "power-save mode" in which the first networked device may effectively shut down many operating functions for a time period to save energy. Such an exemplary second networked device may, for example, operate in a power-save mode, sometimes operating in a sleeping state and occasionally waking to an active state to communicate with a network access point to determine if the access point has buffered messages addressed to the second networked device.

Step 220 may, for example, determine if the second networked device is operating in the power-save mode, and/or a sleep state of a power-save mode, by analyzing the incoming message for an indication that the second networked device is capable of such operation and has enabled such operational mode. Alternatively, for example, step 220 may include analyzing a database of networked device information to determine if the database indicates that the second networked device is capable of power-save mode operation and has enabled its power-save mode of operation or a sleep state thereof. For example, when the second networked device entered the communication network, the second networked device may have registered with the network, providing operating capability information, such as whether the device is power-save capable. Also, for example, the second networked device may communicate its current state of power-save operation in a variety of ways.

If step 220 determines that the second networked device is not a power-save device or, for example, the second networked device is a power-save device that is currently in a sleep state, the exemplary method 200 flow may end, at which time the operation of the first networked device may, for example, return to the mode of operation at which the first networked device was operating when the incoming message arrived. Conversely, for example, if step 220 determines that the second networked device is a power-save device and is currently not operating in a sleep state, the method 200 flow may continue to step 230. Although the illustrative exemplary method 200 includes special accommodations for power-save devices, and the method 200 may include communicating with power-save devices differently than non-power-save devices, the scope of various aspects of the present invention should not be limited by such exemplary operation.

The method 200, at step 230, includes determining if the first networked device has a message for delivery to the second networked device. The first networked device may, for example, include a message buffer in which the first networked device stores outgoing messages destined for other networked devices. For example, in a communication network having networked devices capable of power-save operation, the first networked device may buffer outgoing messages that are addressed to the second networked device. The first networked device may buffer such messages, for example, until the first networked device receives an indication that the second networked device is not currently operating in a power-save mode and/or until the first networked device receives an indication that the second networked device is not currently operating in a sleeping state.

If step 230 determines that the first networked device does not have an outgoing message to send to the second networked device, the method 200 flow may end, at which time the operation of the first networked device may, for example, return to the mode of operation at which the first networked device was operating when the incoming message arrived. Conversely, if step 230 determines that the first networked device has an outgoing message to send to the second networked device, the method 200 flow may continue to step 240.

The method 200, at step 240, having determined that the first networked device has an outgoing message to communicate to the second networked device, determines if there is enough time to communicate the outgoing message to the second networked device and maintain operation within the timing constraints of the communication network. For example, the communication network may have a maximum time limit for which one or both of the first and second networked devices may utilize the communication medium before allowing other networked devices an opportunity to access the communication medium.

In such an exemplary situation, step 240 may determine how long it will take to communicate the outgoing message to the second networked device. Such a time determination may include, for example, determining how long it will take the first networked device to transmit the outgoing message to the second networked device and how long it will take the second networked device to return an acknowledgement message to the first networked device. Having determined the communication time, the first networked device may compare the communication time to how much time the first networked device has left for utilizing the communication medium before system timing constraints require the first and/or second networked devices to release control of the communication medium for potential utilization by other networked devices.

If step 240 determines that there is not time under the system time constraints to effectively communicate the outgoing message to the second networked device, the exemplary method 200 flow may end, at which time the operation of the first networked device may, for example, return to the mode of operation at which the first networked device was operating when the incoming message arrived. Conversely, if step 240 determines that the first networked device has time to effectively communicate the outgoing message to the second networked device, the method 200 flow may continue to step 250.

The method, at step 250, includes bypassing the process of contending for access to the communication medium to communicate the outgoing message to the second networked device. For example, in an exemplary scenario, the second networked device may have awakened from a sleeping state of the power-save mode and gained access to the communication medium using a contention-based medium access protocol, such as, for example CSMA/CA. Having contended with other networked devices for access to the communication medium, and having acquired control of the communication medium, the second networked device may then have transmitted the incoming message to the first networked device.

The first networked device, having determined at step 220 that the second networked device is a power-save device, and having determined at step 230 that the first networked device has a message for the power-save device, may, for example, at step 250 utilize the communication medium to communicate the outgoing message to the second networked device without contending with other networked devices for access to the communication medium. Such operation may provide for communicating one or more outgoing messages to the second networked device in a time-efficient, and thus energy-efficient, manner. Note that such medium access operation is exemplary and should, by no means, limit the scope of various aspects of the present invention to particular medium access protocols.

The method 200, at step 260, includes bypassing the outgoing message queue to transmit, at step 270, the outgoing message to the second networked device. For example, when the first networked device received the incoming message, the first networked device may have had one or more outgoing messages in an outgoing message queue waiting for transmission. Rather than placing the outgoing message destined for the second networked device in the outgoing message queue to wait in line behind the messages already queued in the outgoing message queue, step 260 includes by-passing one or more messages in the outgoing message queue. Thus, step 260 provides for the outgoing message destined for the second networked device to be delivered to the second networked device in a time-efficient manner.

An exemplary advantage provided by step 260 is that in a power-save scenario where the second networked device has emerged from a power-save mode to communicate with the first networked device, the second networked device may complete its communications with the first networked device and return to the power-save mode in a time-efficient manner, thereby reducing unnecessary energy consumption by the second networked device.

The outgoing message transmitted to the second networked device may take various forms. For example, in a scenario where the first networked device is able to retrieve a buffered message addressed to the second networked device quickly enough to meet communication system timing constraints, the outgoing message may include the buffered message. In an alternative example, the first networked device may not be able to retrieve a buffered message addressed to the second networked device quickly enough to meet communication system timing constraints. In such a scenario, the first networked device may communicate an alternative message (e.g., a null data message) to the second networked device. Such a message may, for example, provide for maintaining control over the communication medium and may also serve as an indication to the second networked device that a message or stream of messages is forthcoming from the first networked device. Note that the scope of various aspects of the present invention should not be limited to a particular form of outgoing message.

After transmitting a first outgoing message to the second networked device at step 270, the method, at step 280, may include waiting for a second incoming message from the second networked device. For example, such a second incoming message may include an acknowledgment from the second networked device that the second networked device received the most recent message transmitted to the second networked device at step 270. The second incoming message may, for example, also include a request from the second networked device for the first networked device to retransmit a message. The first networked device may, for example, respond to such a request, or the absence of a response message, by retransmitting the outgoing message to the second networked device.

After transmitting a first outgoing message to the second networked device at step 270, and optionally waiting for a second incoming message at step 280, the method 200, at step 290, determines if the first networked device has an additional message buffered that is addressed to the second networked device. If step 290 determines that the first networked device has no more messages for the second networked device, the method 200 flow may end, at which time the operation of the first networked device may, for example, return to the mode of operation at which the first networked device was operating when the incoming message arrived.

Conversely, if step 290 determines that the first networked device has an additional outgoing message to send to the second networked device, the method 200 flow may loop back to step 240. Having looped back to step 240, the method 200 flow may repeat steps 240-290 until the first networked device has no more outgoing messages buffered for the second networked device or until system timing constraints require the first and/or second networked devices to release control of the communication medium for potential utilization by other networked devices.

Figure 3:
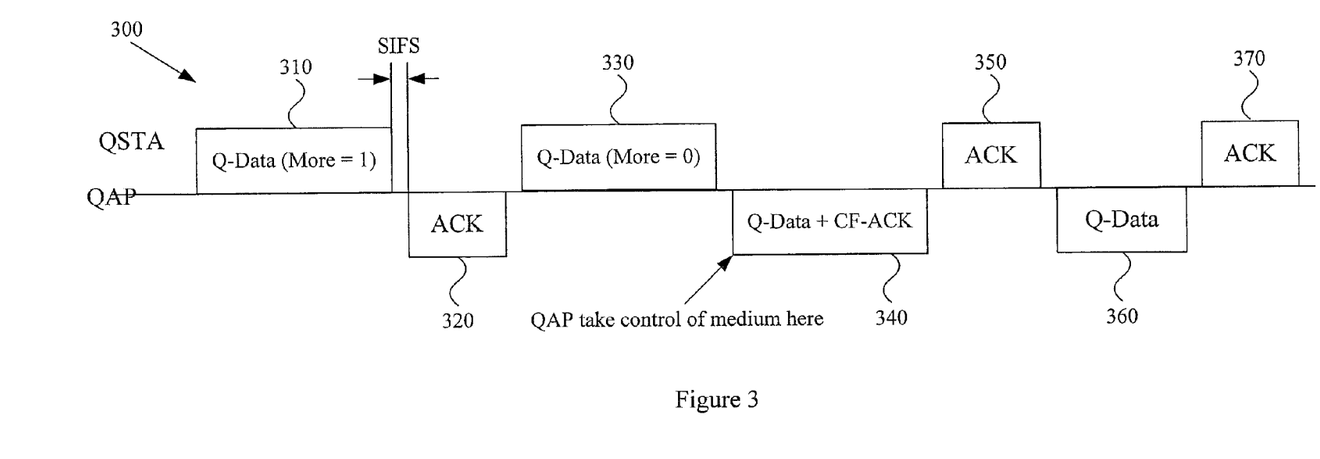
FIG. 3 illustrates a first exemplary message exchange between two networked devices in accordance with various aspects of the present invention.
Figure 4:
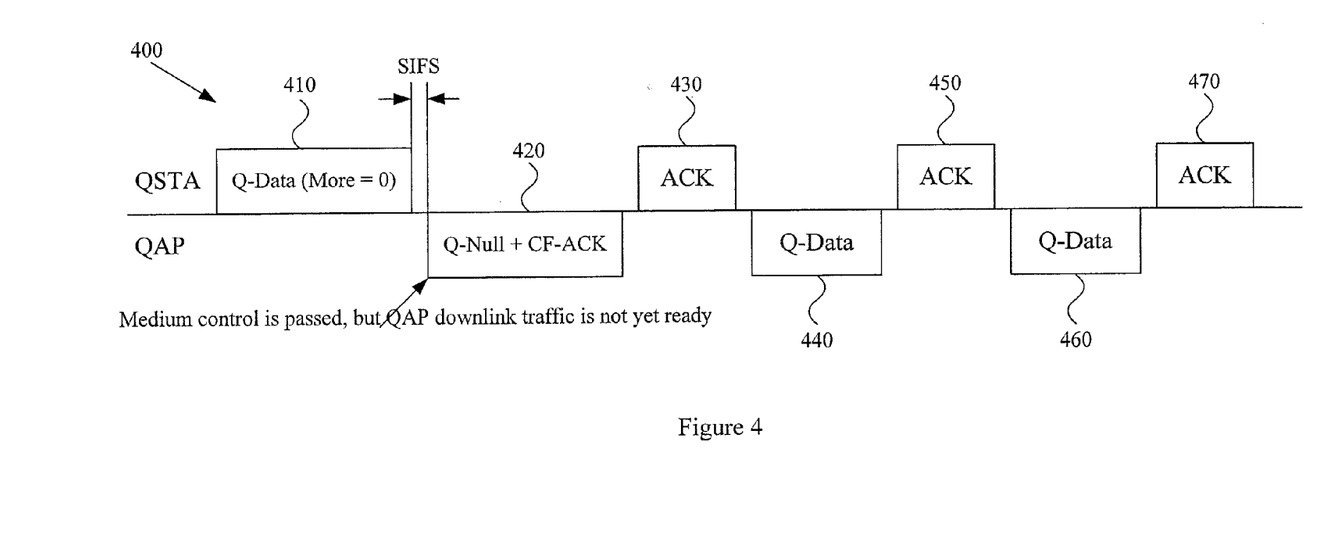
FIG. 4 illustrates a second exemplary message exchange between two networked devices in accordance with various aspects of the present invention.

The methods 100 and 200 illustrated in FIGS. 1 and 2 show various aspects of exemplary methods for communicating information between a first networked device and a second networked device. Refer now to FIGS. 3 and 4 for exemplary applications of portions of the methods 100, 200 to an IEEE 802.11 communication environment.

FIG. 3 illustrates a first exemplary message exchange 300 between two networked devices in accordance with various aspects of the present invention. As explained above, the exemplary message exchange 300 is provided in the context of the IEEE 802.11 standard. However, by no means, should the scope of various aspects of the present invention be limited to IEEE 802.11 features and implementations.

The bottom row of the message exchange 300 is labeled "QAP." This generally refers to a quality of service access point in the IEEE 802.11 context. The QAP may be generally thought of, for this example, as a first networked device. The top row of the message exchange 300 is labeled "QSTA." This generally refers to a quality of service station in the IEEE 802.11 context. The QSTA may be generally thought of, for this example, as a second networked device that may have power-save capabilities.

Prior to the exemplary message exchange 300, the QSTA gains access to and control of the communication medium. For example, the QSTA may acquire access to the communication medium following a contention-based medium access protocol, such as, for example CSMA/CA.

The message (or packet) exchange 300 begins with a first message 310 sent from the QSTA to the QAP. The first message 310 may, for example, be a Q-Data message with the "More" flag set. Such an exemplary first message 310 may communicate data to the QAP and also indicate to the QAP, in a power-save scenario, that the QSTA is not currently operating in the sleep state of the power-save mode.

Following an inter-frame spacing interval (SIFS), the message exchange 300 includes the QAP sending a second message 320 to the QSTA. The second message 320 may, for example, be an acknowledgement message (ACK) to indicate to the QSTA that the QAP successfully received the first message 310.

The message exchange 300 then includes a third message 330 from the QSTA to the QAP. The third message 330 may, for example, be a Q-Data message with the "More" flag unset. The unset "More" flag may indicate to the QAP that the QSTA has no more data to send to the QAP. The unset "More" flag may also, for example, indicate to the QAP that the QSTA is standing by to receive information from the QAP that the QAP may have buffered for the QSTA while the QSTA was operating in the sleep state of the power-save mode.

As discussed previously, the QAP, at this point, may treat power-save devices differently than non-power-save devices. For example, if the QAP determines that the QSTA is not a power-save device, the QAP may, for example, merely acknowledge receipt of the third message 330 and cease communicating with the QSTA, returning to the mode of operation at which the QAP was operating when it received the first message 310. Conversely, if the QAP determines that the QSTA is a power-save device, the QAP may, for example, enter an operating mode for communicating buffered information to power-save devices.

At this point in the exemplary message exchange 300, the QAP may, for example, assume control over the communication medium. The QAP, upon determining that the QAP has a message (or information) buffered for the QSTA, and upon determining that there is time within the system time constraints to communicate the message to the QSTA, responds by sending a fourth message 340 to the QSTA. The fourth message 340 may, for example, be a Q-Data message that includes data for the QSTA and an indication acknowledging receipt of the third message 330. The exemplary QAP, having an outgoing message queue for outgoing messages, may bypass the outgoing message queue with the fourth message 340, thereby delivering the fourth message 340 to the QSTA in a time-efficient manner.

The exemplary message exchange 300 then includes a fifth message 350 from the QSTA to the QAP, which may, for example, acknowledge receipt of the fourth message 340 by the QSTA. The message exchange 300 then, upon the QAP determining that the QAP has an additional message (or information) buffered for the QSTA, and upon determining that there is time within the system time constraints to communicate the message to the QSTA, includes a sixth message 360 from the QAP to the QSTA, which may, for example, include additional data for the QSTA. The exemplary QAP, having an outgoing message queue for outgoing messages, may bypass the outgoing message queue with the sixth message 360, thereby delivering the sixth message 360 to the QSTA in a time-efficient manner.

The message exchange 300 then includes a seventh message 370 from the QSTA to the QAP, which may, for example, include an indication acknowledging receipt of the sixth message 360 by the QSTA.

The exemplary message exchange 300 may continue with the QSTA and the QAP exchanging information, for example, until the QAP exhausts its supply of information to be communicated to the QSTA. Alternatively, for example, the QSTA and QAP may discontinue the message exchange 300 due to expiration of a system time limit on medium access.

FIG. 4 illustrates a second exemplary message exchange 400 between two networked devices in accordance with various aspects of the present invention. As with the exemplary message exchange 300 illustrated in FIG. 3, the second exemplary message exchange 400 is provided in the context of the IEEE 802.11 standard. However, by no means, should the scope of various aspects of the present invention be limited to IEEE 802.11 features and implementations.

The bottom row of the message exchange 400 is labeled "QAP." This generally refers to a quality of service access point in the IEEE 802.11 context. The QAP may be generally thought of, for this example, as a first networked device. The top row of the message exchange 400 is labeled "QSTA." This generally refers to a quality of service station in the IEEE 802.11 context. The QSTA may be generally thought of, for this example, as a second networked device that may have power-save capabilities.

Prior to the exemplary message exchange 400, the QSTA gains access to and control of the communication medium. For example, the QSTA may acquire access to the communication medium following a contention-based medium access protocol, such as CSMA/CA.

The exemplary message (or packet) exchange 400 begins with a first message 410 sent from the QSTA to the QAP. The first message 410 may, for example, be a Q-Data message with the "More" flag unset. Such a first message 410 may, for example, indicate to the QAP in a power-save scenario that the QSTA is not currently operating in a power-save mode and is standing by to receive traffic that the QAP may have been buffering for the QSTA while the QSTA was in a power-save mode. The unset "More" flag may also, for example, indicate to the QAP that the QAP may assume control over the communication medium without interference from the QSTA.

As discussed previously, the QAP, at this point, may treat power-save devices differently than non-power-save devices. For example, if the QAP determines that the QSTA is not a power-save device, the QAP may merely acknowledge receipt of the first message 410 and cease communicating with the QSTA, thereby releasing the communication medium and returning to the operating mode at which the QAP was operating when it received the first message 410. Conversely, if the QAP determines that the QSTA is a power-save device, the QAP may, for example, enter a special operating mode for communicating buffered information to power-save devices.

At this point in the exemplary message exchange 400, the exemplary QAP assumes control over the communication medium. The QAP, upon determining that the QAP has a message (or information) buffered for the QSTA, and upon determining that there is time within the system time constraints to communicate the message to the QSTA, responds by sending a second message 420 to the QSTA. The second message 420 may, for example, be a Q-Data message that includes data for the QSTA and an indication acknowledging receipt of the first message 410. The exemplary QAP, having an outgoing message queue for outgoing messages, may bypass the outgoing message queue with the second message 420, thereby delivering the second message 420 to the QSTA in a time-efficient manner.

Additionally, for example, the second message 420 may include a null data frame, which may indicate to the QSTA that the QAP has information traffic buffered for delivery to the QSTA, but that the QAP needs additional time to acquire the information from the buffer. Such a null data frame may, for example, allow the QAP to retain control of the communication medium (e.g., a communication medium controlled by a contention-based medium access control protocol) while the QAP is obtaining the information traffic destined for the QSTA.

The exemplary message exchange 400 then includes a third message 430 from the QSTA to the QAP. The third message 430 may, for example, include an indication to acknowledge receipt of the second message 420 by the QSTA.

The message exchange 400 then, upon the QAP determining that the QAP has an additional message (or information) buffered for the QSTA, and upon determining that there is time within the system time constraints to communicate the message to the QSTA, includes a fourth message 440 from the QAP to the QSTA, which may, for example, include additional data for the QSTA. The exemplary QAP, having an outgoing message queue for outgoing messages, may bypass the outgoing message queue with the fourth message 440, thereby delivering the fourth message 440 to the QSTA in a time-efficient manner.

The message exchange 400 then includes a fifth message 450 from the QSTA to the QAP, which may, for example, include an indication acknowledging receipt of the fourth message 440.

The message exchange 400 then, upon the QAP determining that the QAP has an additional message (or information) buffered for the QSTA, and upon determining that there is time within the system time constraints to communicate the message to the QSTA, includes a sixth message 460 from the QAP to the QSTA, which may, for example, include additional data for the QSTA. The exemplary QAP, having an outgoing message queue for outgoing messages, may bypass the outgoing message queue with the sixth message 460, thereby delivering the sixth message 460 to the QSTA in a time-efficient manner.

The message exchange 400 then includes a seventh message 470 from the QSTA to the QAP, which may, for example, include an indication acknowledging receipt of the sixth message 460.

The exemplary message exchange 400 may continue with the QSTA and the QAP exchanging information, for example, until the QAP exhausts its supply of information to be communicated to the QSTA. Alternatively, for example, the QSTA and QAP may discontinue the message exchange 400 due to expiration of a system time limit on medium access.

Figure 5:
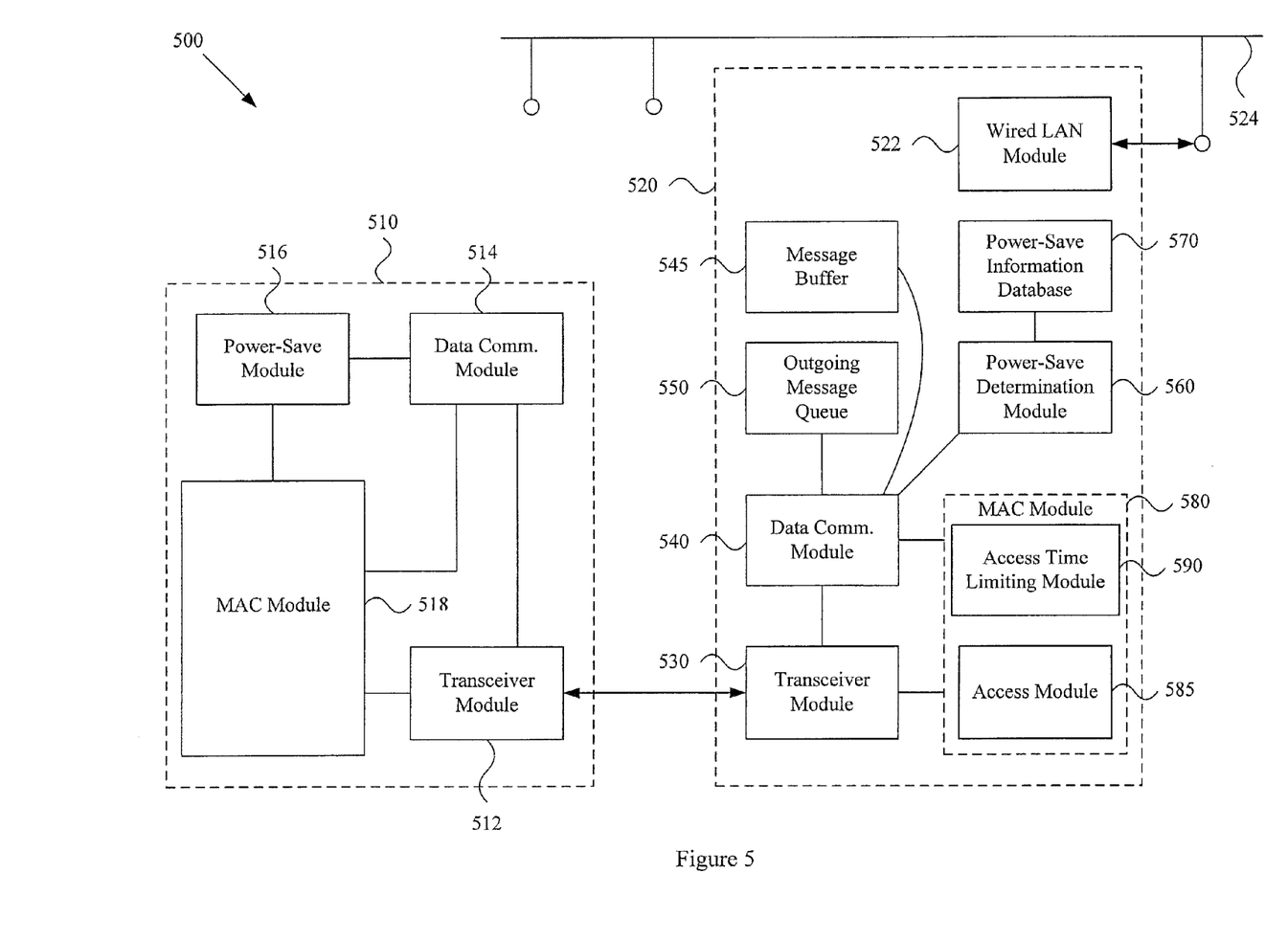
FIG. 5 shows a block diagram of a communication system utilizing a communication module for communicating information from a first networked device to a second networked device in accordance with various aspects of the present invention.

FIG. 5 shows a block diagram of a communicating system 500 utilizing a communication module 520 for communicating information between a first networked device and a second networked device 510 in accordance with various aspects of the present invention. The communication module 520 may, for example, be utilized by a first networked device in a communication network. For example and without limitation, the first networked device may be an access point communicatively coupled to a wired network 524 using a wired LAN module 522. The second networked device 510 may, for example, be communicatively coupled to the communication module 520 over a wireless communication link.

The exemplary second networked device 510 includes a transceiver module 512 for communicating over communication links to other networked devices. The second networked device 510 may include a MAC Module 518 that governs access to the network communication medium. The second networked device 520 may also include a data communication module 514 that generally controls the flow of data between the second networked device 510 and other networked devices. The second networked device 510 may further include a power-save module 516 that provides the second networked device 510 the capability to operate in a power-save mode as discussed previously. FIG. 5 shows the exemplary second networked device 510 having various components for illustrative purposes only. Accordingly, the scope of various aspects of the present invention should, in no way, be limited to characteristics of the exemplary second networked device 510.

The exemplary communication module 520 may include a transceiver module 530 communicatively coupled to a data communication module 540. The data communication module 540 may be communicatively coupled to a message buffer 545 and an outgoing message queue 550. The communication module 520 may, for example, also include a Medium Access Control (MAC) module 580 communicatively coupled to the data communication module 540 and the transceiver module 530. The MAC module 580, in turn, may include an access time limiting module 590 and an access module 585. The communication module 520 may, for example, additionally include a power-save determination module 560 communicatively coupled to the data communication module 540 and a power-save information database 570. FIG. 5 shows the exemplary communication module 520 having various components for illustrative purposes only, and accordingly, in no way, should the various characteristics (e.g., sub-module boundaries, couplings and locations) of the exemplary communication module 520 limit the scope of various aspects of the present invention.

The transceiver module 530 is capable of receiving an incoming message from the second networked device 510. As explained previously, the second networked device 510 may, for example, include a power-save module 516, providing the second networked device 510 with the capability to operate in a power-save mode. Also as explained previously, the second networked device 510 may, for example, include a MAC module 518 that gains access to and control of the network communication medium utilizing a contention-based medium access protocol. The second networked device 510 may, for example, send an incoming message to the communication module 520 after exiting from the power-save mode and gaining access to the communication medium using the contention-based medium access protocol.

The incoming message may, for example, indicate to the communication module 520 that the second networked device 510 is ready to receive information from the communication module 520. If the second networked device 510 is capable of power-save operation, the incoming message may, for example, indicate that the second networked device 510 is not currently in a power-save mode and/or is not currently in the sleeping state of a power-save mode. Though various components of the illustrative communication system 500 may be related to networked devices having power-save capability, various aspects of the present invention should not be limited to methods and apparatus associated with such power-save devices.

The incoming message may assume a variety of forms, including, but not limited to, a data message and a control message. The incoming message may, for example, be a data message including an indication that the second networked device 510 has no data, or no more data, to send to the communication module 520. Accordingly, the scope of various aspects of the present invention should not be limited to characteristics of the incoming message.

The communication module 520 includes a data communication module 540. The data communication module 540 may, for example, control the general flow of information between the communication module 520 and other networked devices.

The communication module 520 includes a power-save determination module 560, which may determine if the second networked device 510 is capable of operating in a power-save mode. The power-save determination module 560 may additionally, for example, determine whether the second networked device 510 is currently operating in a sleep state of a power-save mode. The exemplary power-save determination module 560 may, for example, analyze information in the power-save information database 570 to determine whether the second networked device 510 is a power-save device. The exemplary power-save determination module 560 may also, for example, analyze information in the power-save information database 570 to determine whether the second networked device 510 is currently operating in a sleep state of a power-save mode.

The power-save information database 570 may, for example, include operational information for devices in the communication network. For example, when a device enters the communication network, the device may register by providing operational capabilities. Alternatively, for example, the power-save determination module 560 may analyze the incoming message to determine whether the second networked device 560 is a power-save device or whether the second networked device 560 is currently operating in a sleep state of a power-save mode. Accordingly, the scope of various aspects of the present invention should not be limited to a particular method or apparatus for determining the power-save capability and state of a networked device.

The data communication module 540 may utilize the power-save determination module 560 to determine whether the second networked device 510 is a power-save device or, for example, whether the second networked device 510 is in a sleep state. If the power-save determination module 560 determines that the second networked device 510 is not a power-save device, the data communication module 540 may, for example, return to the mode of operation at which the data communication module 540 was operating when the incoming message arrived. Conversely, if the power-save determination module 560 determines that the second networked device 510 is a power-save device and is currently not in a sleep state of a power-save mode, the data communication module 540 may conduct communications with the second networked device 510 in a manner conducive to the needs of such power-save devices. Note, however, that communicating with networked devices in a different manner depending on whether the networked devices are power-save devices is but one exemplary operating characteristic of the communication module 520 and should not limit the scope of various aspects of the present invention.

The data communication module 540 is communicatively coupled to the message buffer 545. The communication module 520 or other modules in the first networked device may, for example, utilize the message buffer 545 to store message information for delayed communication to other networked devices. For example, the communication module 520 may store message information in the message buffer 545 that is addressed to networked devices having power-save capability. The communication module 520 may, for example, store such message information in the message buffer 545 until the communication module 520 receives an indication that the addressed networked device is not in the power-save mode and/or not in the sleeping state of the power save mode and is therefore ready to receive the message information.

After receiving the incoming message from the second networked device 510, the data communication module 540 may determine if the message buffer 545 contains a message (or information) to communicate to the second networked device 510. If the data communication module 540 determines that the communication module 520 does not have an outgoing message to send to the second networked device 510, the data communication module 540 may resume operating in the mode in which the data communication module 540 was operating when the incoming message from the second networked device 510 arrived. Conversely, if the data communication module 540 determines that the communication module 520 has an outgoing message to communicate to the second networked device 510, the data communication module 540 may, for example, proceed to communicating the outgoing message to the second networked device 510.

The communication module 520 may have a MAC module 580 communicatively coupled, for example, to the data communication module 540 and transceiver module 530. The MAC module 580, in turn, may include an access time limiting module 590. The access time limiting module 590 may determine if there is enough time to communicate an outgoing message to the second networked device 510 and maintain operation within the timing constraints of the communication network 500. For example the communication network 500 may have a maximum time limit for which one or more communicating networked devices may utilize the communication medium before allowing other networked devices an opportunity to access the communication medium.

The access time limiting module 590 may determine how long it will take to communicate a particular outgoing message to the second networked device 510. Such a time determination may include, for example, determining how long it will take the data communication module 540 to transmit the outgoing message to the second networked device 510 and how long it will take the second networked device 510 to communicate a return message to the data communication module 540. Having determined the communication time, the access time limiting module 590 may compare the communication time to how much time the data communication module 540 has left for utilizing the communication medium before system timing constraints require the data communication module 540 to release control of the communication medium for potential utilization by other networked devices.

If the access time limiting module 590 determines that there is not enough time remaining under the system time constraints to effectively communicate the outgoing message to the second networked device 510, the data communication module 540 may, for example, return to the mode of operation at which the data communication module 540 was operating when the incoming message arrived. Conversely, if the access time limiting module 590 determines that the data communication module 540 has time to effectively communicate the outgoing message to the second networked device 510, the data communication module 540 may proceed to communicate the outgoing message to the second networked device 510.

The MAC module 580, discussed previously, may also include an access module 585 that controls the communication module's 520 access to the communication medium. For example, in a communication network where access to the communication medium is governed by a contention-based medium access protocol, the access module 585 may perform the necessary protocol steps to acquire access to and control of the communication medium.

In an exemplary scenario, the second networked device 510 may have awakened from the sleep state of the power-save mode and gained access to the communication medium using a contention-based medium access protocol, such as, for example, CSMA/CA. Having contended with other networked devices for access to the communication medium, and having acquired control of the communication medium, the second networked device 510 may then have transmitted the incoming message to the communication module 520. The communication module 520, having determined that the second networked device 510 is a power-save device and is not currently in a sleep state, and having determined that the communication module 520 has an outgoing message for the power-save device, may, for example, utilize the communication medium to communicate the outgoing message to the second networked device 510 without contending with other networked devices for access to the communication medium. The MAC module 580 may, for example, provide this medium access functionality to the communication module 520.

Such operation may provide for communicating one or more outgoing messages to the second networked device 510 in a time-efficient, and thus energy-efficient, manner. Though the previous example concerned communicating information to a power-save device, such exemplary operation should, by no means, limit the scope of various aspects of the present invention to methods and apparatus related to communicating information with power-save devices.

The data communication module 540 is communicatively coupled to an outgoing message queue 550 that contains a queue of messages to be transmitted over the communication medium. In particular scenarios, the data communication module 540 may by-pass the outgoing message queue and utilize the transceiver module 530 to send an outgoing message over the communication medium. For example, when the communication module 520 receives an incoming message, the communication module 520 (or device utilizing the communication module 520) may have had one or more outgoing messages in an outgoing message queue waiting for transmission over the communication network. Rather than placing the outgoing message destined for the second networked device 510 in the outgoing message queue 550 to wait in line behind the messages already queued in the outgoing message queue 550, the data communication module 540 may bypass one or more messages in the outgoing message queue.

Such exemplary operation provides for the outgoing message destined for the second networked device 510 to be delivered to the second networked device 510 in a more time-efficient manner. An exemplary advantage provided by such operation is that in a power-save scenario where the second networked device 510 has emerged from a sleep state of a power-save mode to communicate with the communication module 520 (or device utilizing the communication module), the second networked device 510 may complete its communications with the communication module 520 and return to the sleep state of the power-save mode in a time-efficient manner, thereby reducing unnecessary energy consumption by the second networked device 510.

Though such operation may have advantages in communication networks that include power-save devices, such efficient operation also has advantages in communication networks that do not include power-save devices. Accordingly, the scope of various aspects of the present invention should, by no means, be limited to characteristics related to communicating information with power-save devices.

The outgoing message transmitted to the second networked device 510 may take various forms. For example, in a scenario where the communication module 520 is able to retrieve a buffered message destined for the second networked device 510 quickly enough to meet communication system timing constraints, the outgoing message may include the buffered message. In an alternative example, the communication module 520 may not be able to retrieve a buffered message destined for the second networked device quickly enough to meet communication system timing constraints. In such a scenario, the communication module 520 may communicate an alternate message (e.g., a null data message) to the second networked device 510. Such a message may, for example, provide for maintaining control over the communication medium and may also serve as an indication to the second networked device 510 that a message or stream of messages is forthcoming from the communication module 520. Note that the scope of various aspects of the present invention should not be limited to a particular form of outgoing message.

After transmitting a first outgoing message to the second networked device 510, the communication module 520 may, for example, wait for a second incoming message from the second networked device 510. For example, such a second incoming message may include an acknowledgment from the second networked device 510 that the second networked device 510 received the most recent message transmitted to the second networked device 510 from the communication module 520. The second incoming message may, for example, also include a request from the second networked device 510 for the communication module 520 to retransmit a message. The communication module 520 may, for example, respond to such a request, or the absence of a response message, by retransmitting the outgoing message to the second networked device 510. Note that waiting for a response message from the second networked device 510 is merely an example and should, by no means, limit the scope of various aspects of the present invention to require such a response message.

After transmitting a first outgoing message to the second networked device 510, and optionally waiting for and receiving a second incoming message from the second networked device 510, the data communication module 540 may determine if the communication module 520 has additional message information buffered that is addressed to the second networked device 510. If the data communication module 540 determines that the communication module 520 (or device incorporating the communication module 520) has no more messages for the second networked device 510, the data communication module 540 may, for example, return to the mode of operation at which the data communication module 540 was operating when the original incoming message arrived.

Conversely, if the data communication module 540 determines that the communication module 520 has additional outgoing message information to send to the second networked device 510, the data communication module 540 may, for example, repeat some or all of the various operations described previously with regard to the first outgoing message.

Various modules of the communication module 520 may, for example, be incorporated into a single integrated circuit or incorporated into multiple integrated circuits on a circuit card or multi-chip module. Various modules may include hardware, software, or combinations of hardware and software. Various modules may also, for example, share components of the communication module 520, such as, for example, a microprocessor, memory devices, bus infrastructure, clocks, etc. Accordingly, the scope of various aspects of the present invention should not be limited to particular arrangements and implementations of the various modules and sub-modules discussed.

In summary, a system and method are provided for efficiently communicating information between networked devices in a communication network. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a first networked device having the capability to communicate with a second networked device over a communication medium, the second networked device comprising an outgoing message queue for outgoing messages and a message buffer for stored messages, a method for retrieving information from the second networked device, the method comprising:

transmitting a first message to the second networked device indicating that the first networked device is ready to receive information; and receiving a buffered message that was stored in the message buffer of the second networked device;

wherein the first message comprises characteristics that, when received and processed by the second networked device, cause transmission of the buffered message before at least one queued message that was in the outgoing message queue when the second networked device received the first message.

2. The method of claim 1, where the first message comprises characteristics that, when received and processed by the second networked device, cause transmission of a second buffered message, stored in the message buffer, before the at least one queued message.

3. The method of claim 2, further comprising transmitting an acknowledgement message to the second networked device between transmission of the buffered message and the second buffered message.

4. The method of claim 1, wherein the first message is a data message comprising an indication that the first networked device has no more information to send to the second networked device.

5. The method of claim 1, wherein the buffered message is transmitted before the at least one queued message only if the first networked device is capable of operating in a power-save mode but not currently operating in a sleep state of the power-save mode.

6. The method of claim 1, further comprising registering, with a communication network comprising the second networked device, as a power-save capable device.

7. The method of claim 6, where said registering causes the first networked device to be identified in a networked database as a device capable of power-save operation.

8. The method of claim 1, further comprising:

prior to transmitting the first message to the second networked device, gaining access to the communication medium using a contention-based medium access protocol; and receiving the buffered message without the second networked device contending with other networked devices for access to the communication medium.

9. The method of claim 1, further comprising:

prior to transmitting the first message to the second networked device, gaining access to the communication medium using a contention-based medium access protocol; and receiving the buffered message without the second networked device contending with other networked devices for access to the communication medium during a time period in which access to the communication medium is generally governed by a contention-based medium access protocol.

10. The method of claim 1, wherein the buffered message is only received if communication of the buffered message will complete within a time limit.

11. The method of claim 1, further comprising, if transmission of the buffered message will not begin quickly enough to meet system timing constraints, then receiving a null data message prior to receiving the buffered message.

12. A communication module for utilization in a first networked device having the capability to communicate with a second networked device over a communication medium, the second networked device comprising an outgoing message queue for outgoing messages and a message buffer for stored messages, the communication module comprising:

at least one module operable to, at least:

transmit a first message to the second networked device indicating that the first networked device is ready to receive information;

and receive a buffered message that was stored in the message buffer of the second networked device;

where the first message comprises characteristics that, when received and processed by the second networked device, cause transmission of the buffered message before at least one queued message that was in the outgoing message queue when the second networked device received the first message.

13. The communication module of claim 12, where the first message comprises characteristics that, when received and processed by the second networked device, cause transmission of a second buffered message, stored in the message buffer, before the at least one queued message.

14. The communication module of claim 13, where the at least one module is further operable to transmit an acknowledgement message to the second networked device between transmission of the buffered message and the second buffered message.

15. The communication module of claim 12, where the first message is a data message comprising an indication that the first networked device has no more information to send to the second networked device.

16. The communication module of claim 12, where the buffered message is transmitted before the at least one queued message only if the first networked device is capable of operating in a power-save mode but not currently operating in a sleep state of the power-save mode.

17. The communication module of claim 12, where the at least one module is further operable to register the first networked device, with a communication network comprising the second networked device, as a power-save capable device.

18. The communication module of claim 17, where said registering causes the first networked device to be identified in a networked database as a device capable of power-save operation.

19. The communication module of claim 12, where the at least one module is operable to:

prior to transmitting the first message to the second networked device, gain access to the communication medium using a contention-based medium access protocol, and receive the buffered message without the second networked device contending with other networked devices for access to the communication medium.

20. The communication module of claim 12, where the at least one module is operable to:

prior to transmitting the first message to the second networked device, gain access to the communication medium using a contention-based medium access protocol; and receive the buffered message without the second networked device contending with other networked devices for access to the communication medium during a time period in which access to the communication medium is generally governed by a contention-based medium access protocol.

21. The communication module of claim 12, wherein the at least one module is operable to receive the buffered message only if communication of the buffered message will complete within a time limit.

22. The communication module of claim 12, wherein the at least one module is operable to, if transmission of the buffered message will not begin quickly enough to meet system timing constraints, receive a null data message prior to receiving the buffered message.

23. The communication module of claim 12, wherein the at least one module is integrated in a single integrated circuit.

24. In a first networked device having the capability to communicate with a second networked device over a communication medium, the second networked device comprising an outgoing message queue for outgoing messages and a message buffer for stored messages, a method for retrieving information from the second networked device, the method comprising:

transmitting a first message to the second networked device indicating that the first networked device is ready to receive information;

where the first message comprises characteristics that, when received and processed by the second networked device, cause the second networked device to, at least:

transmit a buffered message stored in the message buffer to the first networked device prior to transmitting at least one queued message that was in the outgoing message queue when the second networked device received the first message.

25. The method of claim 24, where the first message comprises characteristics that, when received and processed by the second networked device, cause the second networked device to transmit a second buffered message stored in the message buffer to the first networked device prior to transmitting the at least one queued message.

26. The method of claim 25, further comprising transmitting an acknowledgement message to the second networked device between transmission of the buffered message and the second buffered message by the second networked device.

27. The method of claim 24, wherein the first message is a data message comprising an indication that the first networked device has no more information to send to the second networked device.

28. The method of claim 24, wherein the second networked device transmits the buffered message prior to transmitting the at least one queued message only if the first networked device is capable of operating in a power-save mode but not currently operating in a sleep state of the power-save mode.

29. The method of claim 24, further comprising registering, with a communication network comprising the second networked device, as a power-save capable device.

30. The method of claim 29, where said registering causes the first networked device to be identified in a networked database as a device capable of power-save operation.

31. The method of claim 24, further comprising prior to transmitting the first message to the second networked device, gaining access to the communication medium using a contention-based medium access protocol, and where the second networked device transmits the buffered message to the first networked device without contending with other networked devices for access to the communication medium.

32. The method of claim 24, further comprising prior to transmitting the first message to the second networked device, gaining access to the communication medium using a contention-based medium access protocol, and where the second networked device transmits the buffered message to the first networked device without contending with other networked devices for access to the communication medium during a time period in which access to the communication medium is generally governed by a contention-based medium access protocol.

33. The method of claim 24, wherein the second networked device only transmits the buffered message if communication of the buffered message will complete within a time limit.

34. The method of claim 24, wherein if transmission of the buffered message will not begin quickly enough to meet system timing constraints, the second networked device transmits a null data message prior to transmitting the buffered message.

35. A communication module for utilization in a first networked device having the capability to communicate with a second networked device over a communication medium, the second networked device comprising an outgoing message queue for outgoing messages and a message buffer for stored messages, the communication module comprising:
  at least one module operable to, at least:
    transmit a first message to the second networked device indicating that the first networked device is ready to receive information;
    where the first message comprises characteristics that, when received and processed by the second networked device, cause the second networked device to, at least:
      transmit a buffered message stored in the message buffer to the first networked device prior to transmitting at least one queued message that was in the outgoing message queue when the second networked device received the first message.

36. The communication module of claim 35, where the first message comprises characteristics that, when received and processed by the second networked device, cause the second networked device to transmit a second buffered message stored in the message buffer to the first networked device prior to transmitting the at least one queued message.

37. The communication module of claim 36, where the at least one module is further operable to transmit an acknowledgement message to the second networked device between transmission of the buffered message and the second buffered message by the second networked device.

38. The communication module of claim 35, where the first message is a data message comprising an indication that the first networked device has no more information to send to the second networked device.

39. The communication module of claim 35, where the second networked device transmits the buffered message prior to transmitting the at least one queued message only if the first networked device is capable of operating in a power-save mode but not currently operating in a sleep state of the power-save mode.

40. The communication module of claim 35, where the at least one module is further operable to register the first networked device, with a communication network comprising the second networked device, as a power-save capable device.

41. The communication module of claim 40, where said registering causes the first networked device to be identified in a networked database as a device capable of power-save operation.

42. The communication module of claim 35, where the at least one module is operable to, prior to transmitting the first message to the second networked device, gain access to the communication medium using a contention-based medium access protocol, and where the second networked device transmits the buffered message to the first networked device without contending with other networked devices for access to the communication medium.

43. The communication module of claim 35, where the at least one module is operable to, prior to transmitting the first message to the second networked device, gain access to the communication medium using a contention-based medium access protocol, and where the second networked device transmits the buffered message to the first networked device without contending with other networked devices for access to the communication medium during a time period in which access to the communication medium is generally governed by a contention-based medium access protocol.

44. The communication module of claim 35, wherein the second networked device only transmits the buffered message if communication of the buffered message will complete within a time limit.

45. The communication module of claim 35, wherein if transmission of the buffered message will not begin quickly enough to meet system timing constraints, the second networked device transmits a null data message prior to transmitting the buffered message.

46. The communication module of claim 35, wherein the at least one module is integrated in a single integrated circuit.

* * * * *